United States Patent
Cabral-McKeand

(10) Patent No.: US 10,993,567 B1
(45) Date of Patent: May 4, 2021

(54) DRONE PARCEL RECEPTACLE

(71) Applicant: Catherine Cabral-McKeand, Kitchener (CA)

(72) Inventor: Catherine Cabral-McKeand, Kitchener (CA)

( * ) Notice: Subject to any disclaimer, the term of this patent is extended or adjusted under 35 U.S.C. 154(b) by 185 days.

(21) Appl. No.: 16/357,453

(22) Filed: Mar. 19, 2019

(51) Int. Cl.
*A47G 29/14* (2006.01)
*A47G 29/20* (2006.01)
*B64C 39/02* (2006.01)

(52) U.S. Cl.
CPC .......... *A47G 29/141* (2013.01); *A47G 29/20* (2013.01); *B64C 39/024* (2013.01); *B64C 2201/128* (2013.01)

(58) Field of Classification Search
CPC ...... A47G 29/141; A47G 29/20; A47G 29/16; A47G 2029/148; B64C 39/02; B64C 39/024; B64C 2201/128; B64D 1/02; B64D 1/12; B64F 1/32; G06Q 10/083; G06Q 10/0832
USPC .......... 232/19, 22, 45; 340/569, 568.1, 5.73; 244/114 R, 118.1, 118.2, 137.1, 137.4; 200/61.63; 705/330
See application file for complete search history.

(56) References Cited

U.S. PATENT DOCUMENTS

| | | | |
|---|---|---|---|
| 6,247,641 B1 * | 6/2001 | Noblet | A47G 29/1201 232/17 |
| 6,328,205 B1 * | 12/2001 | Noblet | A47G 29/1201 232/17 |
| 7,175,071 B1 | 2/2007 | Slagle | |
| 10,039,401 B1 * | 8/2018 | Romanucci | A47C 7/628 |
| 2006/0101874 A1 * | 5/2006 | Mikolajczyk | E05B 17/2088 70/84 |
| 2013/0147626 A1 * | 6/2013 | Hammoud | A47G 29/1214 340/569 |
| 2015/0158599 A1 | 6/2015 | Sisko | |
| 2015/0183528 A1 * | 7/2015 | Walsh | B64F 1/04 701/3 |
| 2016/0101874 A1 | 4/2016 | McKinnon | |
| 2017/0091710 A1 | 3/2017 | Dyke | |
| 2017/0106979 A1 | 4/2017 | Seger | |
| 2017/0116568 A1 | 4/2017 | Pleis | |
| 2017/0228692 A1 * | 8/2017 | Pargoe | B65D 43/16 |
| 2018/0049575 A1 * | 2/2018 | Yamrick | G06Q 10/0836 |
| 2018/0070753 A1 * | 3/2018 | Eveloff | A47G 29/141 |
| 2018/0105289 A1 * | 4/2018 | Walsh | B60L 53/51 |
| 2018/0228311 A1 * | 8/2018 | Bloom | B64C 39/024 |
| 2019/0133363 A1 * | 5/2019 | Burchat | A47G 29/141 |
| 2019/0350398 A1 * | 11/2019 | Raphael | A47G 29/141 |

(Continued)

*Primary Examiner* — William L Miller

(57) ABSTRACT

The drone parcel receptacle receives a package delivered by the unmanned aerial vehicle. The parcel receptacle attaches to a window. The drone parcel receptacle automatically closes and locks after receiving a parcel. The drone parcel receptacle comprises a drop box, a lid, a latch, and a plurality of torsion springs. The lid attaches to the drop box. The latch attaches to both the drop box and the lid. The plurality of torsion springs attaches to both the drop box and the lid. The drop box receives the package from the unmanned aerial vehicle. The lid encloses the drop box after the package has been received. The latch locks the drone parcel receptacle in the closed position. The latch is released from the interior of the residence. The plurality of torsion springs store the energy required to close the lid on the drop box.

16 Claims, 5 Drawing Sheets

(56) References Cited

U.S. PATENT DOCUMENTS

| | | | |
|---|---|---|---|
| 2020/0013008 A1* | 1/2020 | Newcomb | B64F 1/007 |
| 2020/0048951 A1* | 2/2020 | Herschap | B64D 1/02 |
| 2020/0237946 A1* | 7/2020 | Shell | A47G 29/141 |
| 2020/0245798 A1* | 8/2020 | Perez Friscia | G09F 23/00 |
| 2020/0288895 A1* | 9/2020 | Bennet | G06Q 50/28 |

* cited by examiner

DRONE PARCEL RECEPTACLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including dwelling equipment such as miscellaneous containers for household use, more specifically, a deposit receptacle configured for use with a parcel and an electrically controlled lock. (A47G29/141)

SUMMARY OF INVENTION

The drone parcel receptacle is configured for use with an unmanned aerial vehicle. The drone parcel receptacle receives a package delivered by the unmanned aerial vehicle. The drone parcel receptacle is configured for use with a residence. The residence further comprises a window. The window further comprises a window sill. The drone parcel receptacle attaches to the window sill such that the drone parcel receptacle is receptacle automatically closes and locks after receiving a parcel. The parcel is recovered from the interior of the residence through the window.

The drone parcel receptacle comprises a drop box, a lid, a latch, and a plurality of torsion springs. The lid attaches to the drop box. The latch attaches to both the drop box and the lid. The plurality of torsion springs attaches to both the drop box and the lid. The drop box receives the package from the unmanned aerial vehicle. The lid encloses the drop box after the package has been received. The latch locks the drone parcel receptacle in the closed position. The latch is released from the interior of the residence. The plurality of torsion springs store the energy required to close the lid on the drop box.

These together with additional objects, features and advantages of the drone parcel receptacle will be readily apparent to those of ordinary skill in the art upon reading the following detailed description of the presently preferred, but nonetheless illustrative, embodiments when taken in conjunction with the accompanying drawings.

In this respect, before explaining the current embodiments of the drone parcel receptacle in detail, it is to be understood that the drone parcel receptacle is not limited in its applications to the details of construction and arrangements of illustration. Those skilled in the art will appreciate that the concept of this disclosure may be readily utilized as a basis for the design of other structures, methods, and systems for carrying out the several purposes of the drone parcel receptacle.

It is therefore important that the claims be regarded as including such equivalent construction insofar as they do not depart from the spirit and scope of the drone parcel receptacle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
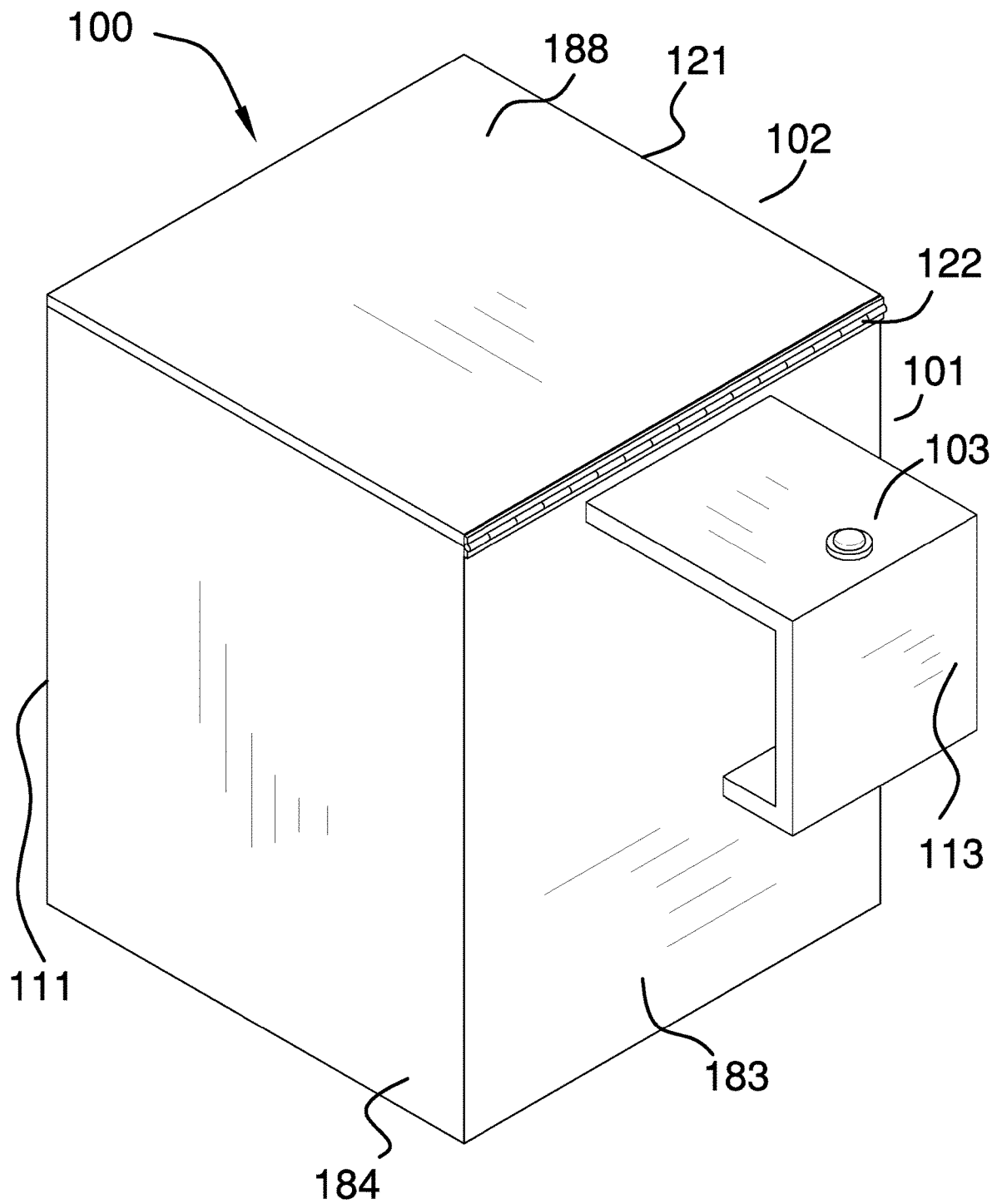
FIG. 1 is a rear perspective view of an embodiment of the disclosure.
Figure 2:
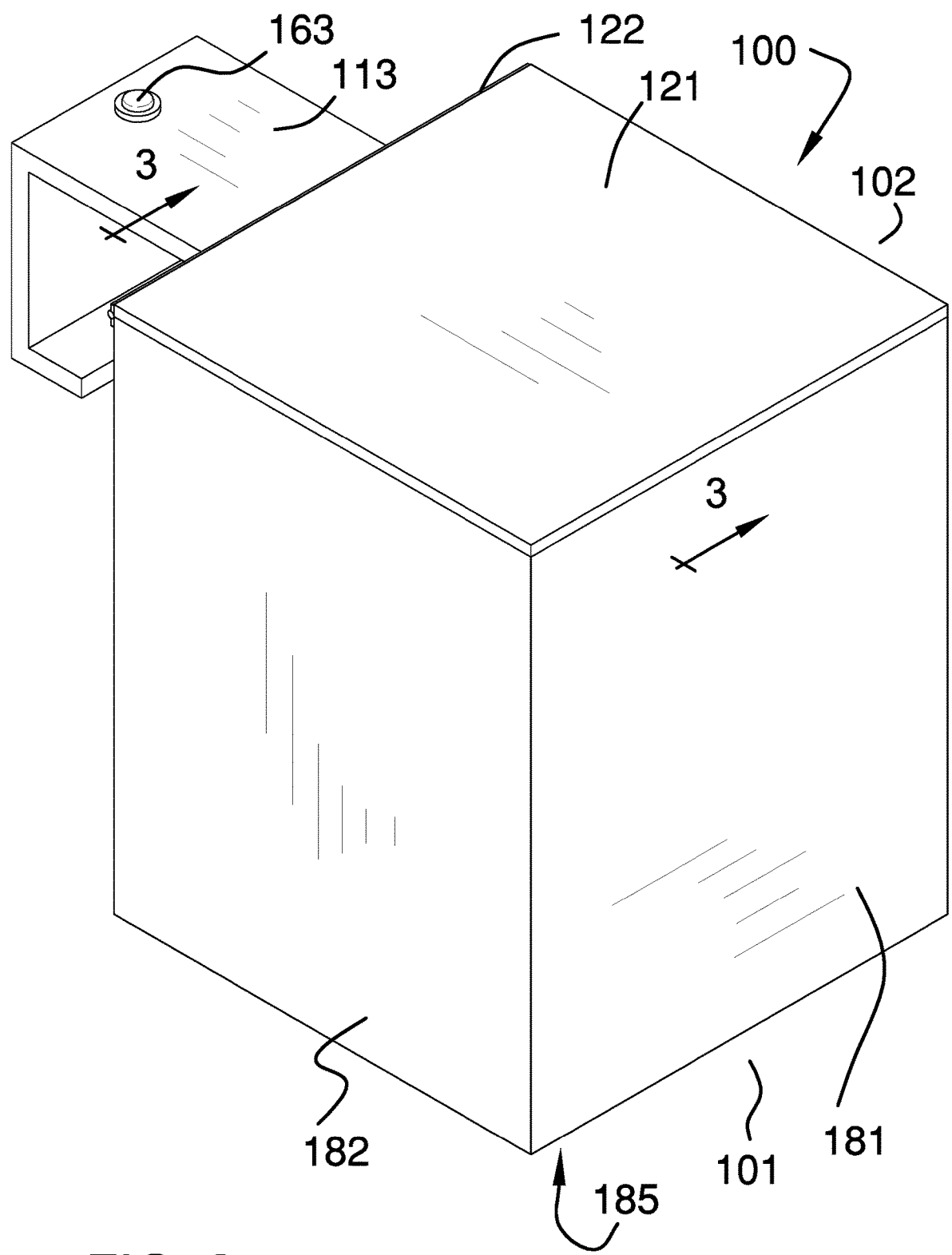
FIG. 2 is a front perspective view of an embodiment of FIG. 3 is a cross-sectional view of an embodiment of the disclosure across 3-3 as shown in FIG. 2.
Figure 3:
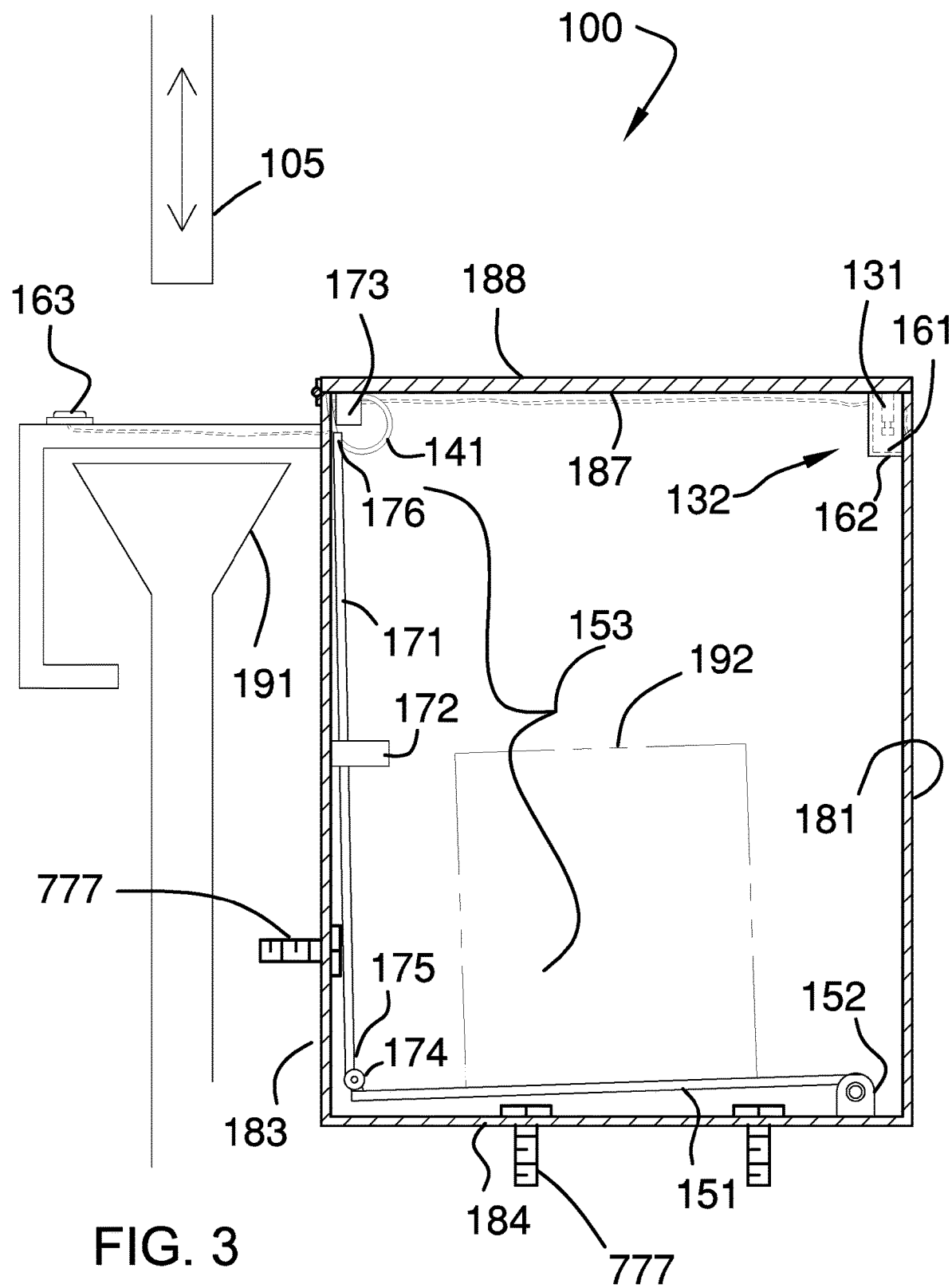
Figure 4:
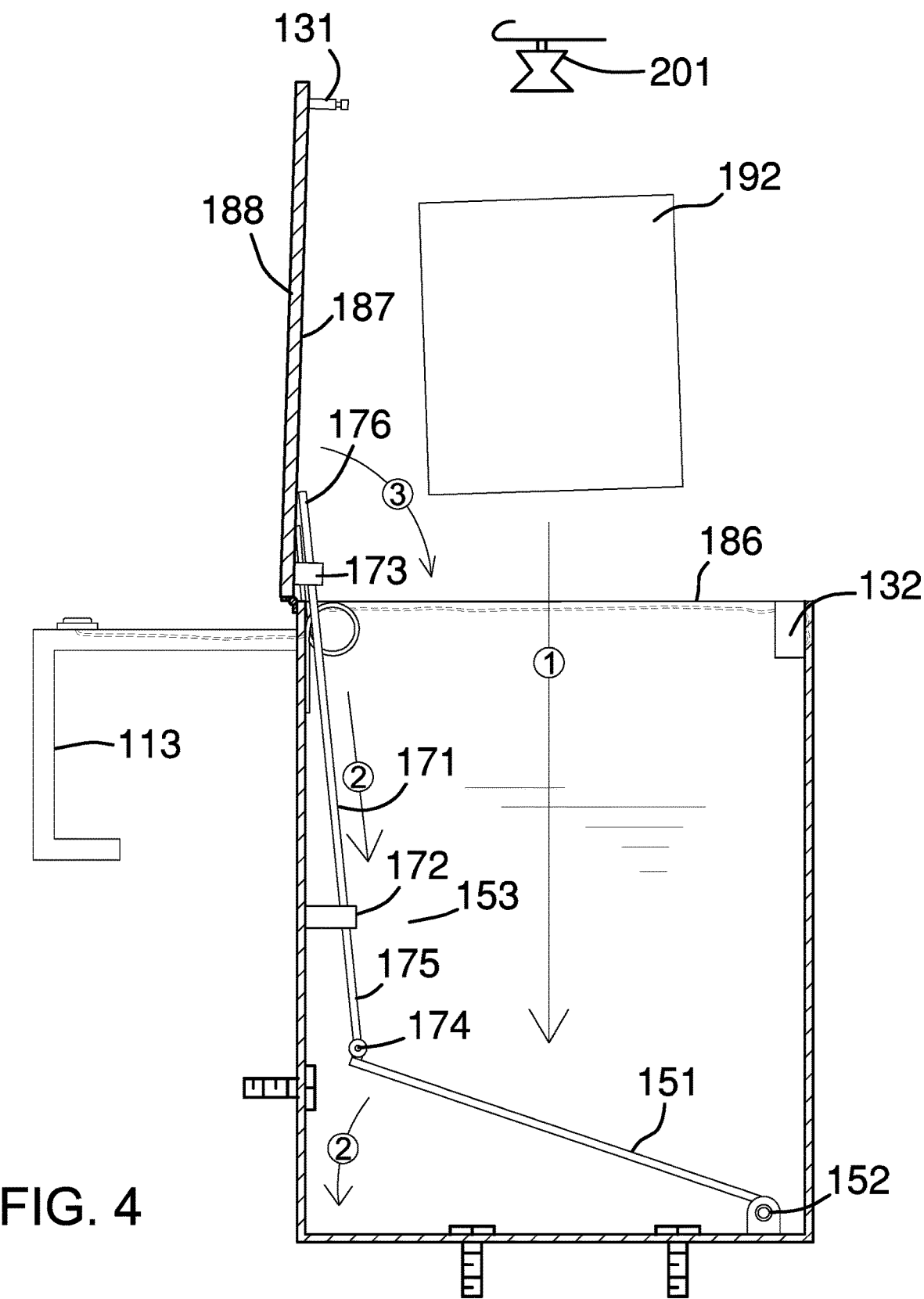
FIG. 4 is an in-use cross-sectional view of an embodiment of the disclosure.
Figure 5:
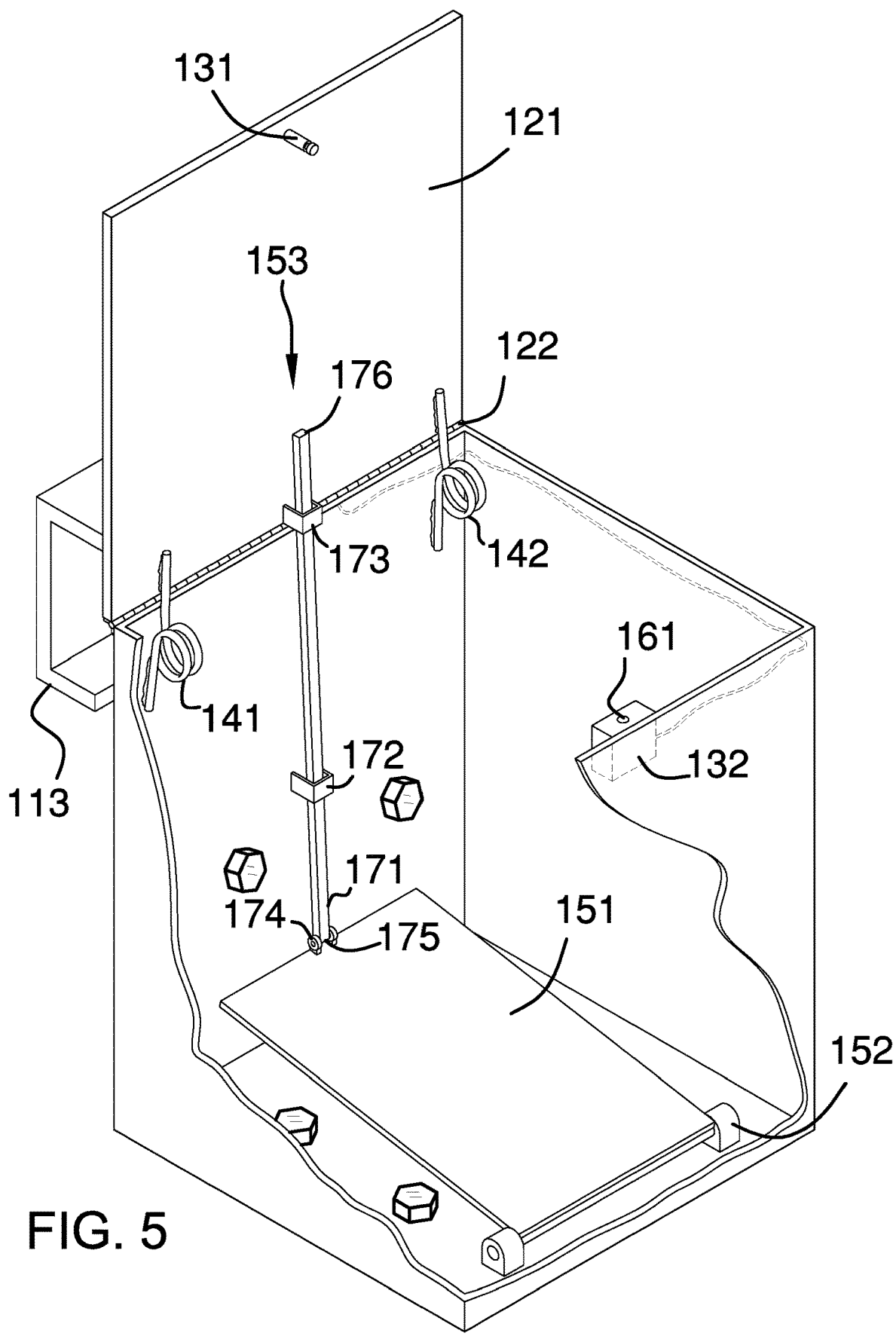
FIG. 5 is a detail view of an embodiment of the disclosure.

Detailed reference will now be made to one or more potential embodiments of the disclosure, which are illustrated in FIGS. 1 through 5.

The drone parcel receptacle 100 (hereinafter invention) is configured for use with an unmanned aerial vehicle 201. The invention 100 receives a package 192 delivered by the unmanned aerial vehicle 201. The invention 100 is configured for use with a residence.

The residence further comprises a window 105. The window 105 further comprises a window 105 sill 191. The window 105 is defined in greater detail elsewhere in this disclosure. The invention 100 attaches to the window 105 sill 191 such that the invention 100 is accessible from the exterior of the residence (see FIG. 3). The invention 100 automatically closes and locks after receiving a parcel. The parcel is recovered from the interior of the residence through the window 105. However, the invention 100 may simply be fastened to an undefined surface on or adjacent to the residence. Also referring to FIG. 3, the invention 100 includes fasteners 777, which facilitate securement of the invention to an undefined surface on or adjacent to the residence. It shall be noted that the fasteners 77 may be referred to as bolts, screws, nails, etc.

The invention 100 comprises a drop box 101, a lid 102, a latch 103, and a plurality of torsion springs 104. The lid 102 attaches to the drop box 101. The latch 103 attaches to both the drop box 101 and the lid 102. The plurality of torsion The drop box 101 receives the package 192 from the unmanned aerial vehicle 201. The lid 102 encloses the drop box 101 after the package 192 has been received. The latch 103 locks the invention 100 in the closed position. The latch 103 is released from the interior of the residence. The plurality of torsion springs 104 store the energy required to close the lid 102 on the drop box 101.

The drop box 101 is a hollow prism-shaped structure. The drop box 101 is formed in the manner of a pan. The drop box 101 forms the containment structure that contains the package 192 after delivery from the unmanned aerial vehicle 201. The drop box 101 attaches the invention 100 to the window 105 sill 191 of the residence. In the first potential embodiment of the disclosure, the drop box 101 has a rectangular block shape. The drop box 101 comprises a container 111, a pressure plate 112, and a window 105 bracket 113.

The container 111 is a hollow prism-shaped structure. The container 111 forms the containment space provided by the drop box 101 for the package 192. The container 111 has the shape of a pan. The container 111 is further defined with a first face 181, a second face 182, a third face 183, a fourth face 184, a fifth face 185, and a sixth face 186.

The first face 181 is a vertical face of the container 111. The third face 183 is a vertical face of the container 111 that is distal from the first face 181. The second face 182 is a vertical face of the container 111 that attaches the first face 181 to the third face 183. The fourth face 184 is a vertical face of the container 111 that attaches the first face 181 to the third face 183. The fourth face 184 is the vertical face of the container 111 that is distal from the second face 182. The fifth face 185 is the closed horizontal face of the container 111. The fifth face 185 forms the inferior surface of the container 111. The sixth face 186 is the open horizontal face of the container 111. The sixth face 186 forms the superior surface of the container 111. The sixth face 186 is the horizontal face of the container 111 that is distal from the fifth face 185.

The pressure plate 112 is a mechanical structure that is contained within the container 111. The pressure plate 112 releases an interlock that holds the plurality of torsion springs 104 in a deformed position such that the plurality of torsion springs 104 will move towards their relaxed shape thereby returning the lid 102 to the closed position. The pressure plate 112 releases the interlock that holds the plurality of torsion springs 104 in a deformed position when the weight of a package 192 is placed on the pressure plate 112. The pressure plate 112 comprises a rotating disk 151, a plate hinge 152, and a batten 153.

The rotating disk 151 is a plate structure contained within the container 111. The rotating disk 151 is sized to receive the package 192 as the package 192 enters the container 111. The rotating disk 151 rotates relative to the container 111. The plate hinge 152 is a hinge that attaches the rotating disk 151 to an interior surface of the container 111. The plate hinge 152 attaches the rotating disk 151 to the container 111 such that the rotating disk 151 rotates within the container 111.

The batten 153 is a mechanical interlock structure that attaches the rotating disk 151 to the lid 102 such that the batten 153 holds the plurality of torsion springs 104 in a deformed state when a package 192 is not contained within the container 111. When the package 192 rests on the rotating disk 151, the rotating disk 151 moves the batten 153 such that the plurality of torsion springs 104 are released to move to their relaxed shape. The batten 153 comprises a batten 153 shaft 171, an inferior batten 153 guide 172, a superior batten 153 guide 173, and a batten 153 hinge 174. The batten 153 shaft 171 is further defined with a first end 175 and a second end 176.

The batten 153 shaft 171 is a shaft structure. The batten 153 shaft 171 forms a vertical stiffening structure that holds the position of the lid 102 plate 121 of the lid 102 in a fixed and open position relative to the container 111 when a package 192 is not in the container 111. When the package 192 rests on the rotating disk 151, the rotating disk 151 rotates such that the second end 176 of the batten 153 shaft 171 is pulled below the lid 102 plate 121 such that the plurality of torsion springs 104 can rotate the lid 102 plate 121 to the closed position.

The inferior batten 153 guide 172 is a commercially available hardware item. The inferior batten 153 guide 172 has a hyoid shape. The inferior batten 153 guide 172 attaches to an interior vertical surface of the container 111 such that the batten 153 shaft 171 inserts through the inferior batten 153 guide 172 between the inferior batten 153 guide 172 and the container 111. The inferior batten 153 guide 172 guides the direction of movement of the batten 153 shaft 171 as the rotating disk 151 moves the batten 153 shaft 171.

The superior batten 153 guide 173 is a commercially available hardware item. The superior batten 153 guide 173 has a hyoid shape. The superior batten 153 guide 173 attaches to the interior horizontal surface of the lid 102 plate 121 such that the batten 153 shaft 171 inserts through the superior batten 153 guide 173 between the superior batten 153 guide 173 and the lid 102 plate 121. The superior batten 153 guide 173 guides the direction of movement of the batten 153 shaft 171 as the rotating disk 151 moves the batten 153 shaft 171. The batten 153 hinge 174 attaches the first end 175 of the batten 153 shaft 171 to the rotating disk 151 of the pressure plate 112.

The batten 153 hinge 174 is an accommodation that allows the batten 153 shaft 171 to rotate relative to the rotating disk 151 as the rotating disk 151 rotates relative to the container 111.

The second end 176 is the end of the batten 153 shaft 171 that inserts through the inferior batten 153 guide 172 and the superior batten 153 guide 173.

The window 105 bracket 113 is a mechanical structure that attaches to the container 111. The window 105 bracket 113 attaches the container 111 to the window 105 sill 191 of the residence.

The lid 102 is a plate structure. The form factor of the lid 102 is geometrically similar to the drop box 101 such that the lid 102 encloses the drop box 101 after receipt of a package 192. The lid 102 attaches to the drop box 101 such that the lid 102 rotates relative to the drop box 101. The lid 102 comprises a lid 102 plate 121 and a lid 102 hinge 122.

The lid 102 plate 121 is a plate structure that rotates relative to the container 111. The lid 102 plate 121 is geometrically similar to the sixth face 186 (open face) of the container 111 such that the lid 102 plate 121 encloses the container 111. The lid 102 hinge 122 attaches the lid 102 plate 121 to the container 111 such that the lid 102 plate 121 rotates relative to the container 111.

The lid 102 plate 121 is further defined with a seventh face 187 and an eighth face 188. The seventh face 187 is the inferior face of the lid 102 plate 121 of the lid 102. The seventh face 187 is the face of the lid 102 plate 121 that is proximal to the sixth face 186 of the container 111 when the lid 102 is in a closed position. The eighth face 188 is the face of the lid 102 plate 121 that is distal from the seventh face 187.

The latch 103 is a fastening structure that secures the lid 102 to the drop box 101 when the lid 102 is in a closed position. The latch 103 is a locking structure that locks the lid 102 in a closed position until the latch 103 is released from the interior of the residence with the window 105 to which the invention 100 attaches. The latch 103 comprises a deadbolt 131 and a bolt box 132. The bolt box 132 comprises a bolt cavity 161, an electric lock 162, and a release switch 163.

The deadbolt 131 is a shaft that attaches to the lid 102 plate 121 of the lid 102 such that the deadbolt 131 inserts into the bolt box 132 when the lid 102 plate 121 is in the closed position. The bolt box 132 is a structure that receives the deadbolt 131 and locks the position of the deadbolt 131 within the bolt box 132.

The bolt cavity 161 is a negative space formed in the bolt box 132. The bolt cavity 161 is geometrically similar to the deadbolt 131 such that the deadbolt 131 inserts into the bolt cavity 161 when the lid 102 is in a closed position. The electric lock 162 is an electrically controlled and powered locking mechanism. The electric lock 162 locks the deadbolt 131 into position when the deadbolt 131 enters the bolt box 132. The release switch 163 is a maintained switch. The release switch 163 releases the electric lock 162 such that the lid 102 can be opened and the package 192 retrieved.

Each of the plurality of torsion springs 104 attaches the drop box 101 to the lid 102. Each of the plurality of torsion springs 104 are identical. Each of the plurality of torsion springs 104 is in a deformed position. Each of the plurality of torsion springs 104 moves towards its relaxed shape as the lid 102 closes on to the drop box 101. Each of the plurality of torsion springs 104 provides the motive force required to close the invention 100 after receipt of the package 192. The plurality of torsion springs 104 comprises a first torsion spring 141 and a second torsion spring 142.

The first torsion spring 141 is a commercially available hardware item. The first torsion spring 141 attaches to the container 111 and the lid 102 plate 121 such that separating the lid 102 plate 121 from the container 111, applies a torque to the first torsion spring 141 such that the first torsion spring 141 attempts to close the lid 102 plate 121 to return to its relaxed shape at a position enclosing the container 111. When the batten 153 presses against the lid 102 plate 121 and the container 111, the first torsion spring 141 applies a force against the batten 153 through the lid 102 plate 121 and the container 111 that effectively separates the lid 102 plate 121 from the container 111.

The second torsion spring 142 is a commercially available hardware item. The second torsion spring 142 attaches to the container 111 and the lid 102 plate 121 such that separating the lid 102 plate 121 from the container 111, applies a torque to the second torsion spring 142 such that the second torsion spring 142 attempts to close the lid 102 plate 121 to return to its relaxed shape at a position enclosing the container 111. When the batten 153 presses against the lid 102 plate 121 and the container 111, the second torsion spring 142 applies a force against the batten 153 through the lid 102 plate 121 and the container 111 that effectively separates the lid 102 plate 121 from the container 111.

The following five paragraphs describe the assembly of the first potential embodiment of the invention 100.

The plate hinge 152 attaches the rotating disk 151 to the fifth face 185 of the container 111 such that the rotating disk 151 rotates towards and away from the third face 183 of the container 111. The batten 153 hinge 174 attaches the first end 175 of the batten 153 shaft 171 to the rotating disk 151. The inferior batten 153 guide 172 attaches to the third face 183 of the container 111. The superior batten 153 guide 173 attaches to the seventh face 187 of the lid 102 plate 121 of the lid 102.

The window 105 bracket 113 attaches to the exterior surface of the third face 183 of the container 111.

The lid 102 hinge 122 attaches the lid 102 plate 121 to the third face 183 of the container 111.

The deadbolt 131 attaches to the seventh face 187 of the lid 102 plate 121 at a location distal to the lid 102 hinge 122. The bolt box 132 attaches to the first face 181 of the container 111 at the sixth face 186 of the container 111.

The first torsion spring 141 attaches the third face 183 of the container 111 to the seventh face 187 of the lid 102 plate 121. The second torsion spring 142 attaches the third face 183 of the container 111 to the seventh face 187 of the lid 102 plate 121.

The following definitions were used in this disclosure:

Automatic: As used in this disclosure, automatic refers to a device, process, or a system that operates without human control, supervision or participation in the operation of the device, process, or system.

Batten: As used in this disclosure, a batten is a rectangular block structure used to reinforce a larger structure, especially a joint between two objects.

Bracket: As used in this disclosure, a bracket is a mechanical structure that attaches a second structure to a first structure such that the load path of the second structure is fully transferred to the first structure.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a movable barrier structure that is in an orientation that prevents passage through a port or an aperture. The closed position is often referred to as an object being "closed."

Congruent: As used in this disclosure, congruent is a term that compares a first object to a second object. Specifically, two objects are said to be congruent when: 1) they are geometrically similar; and, 2) the first object can be superimposed over the second object such that the first object aligns, within manufacturing tolerances, with the second object. Always use Geometrically similar, correspond and one to one Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. In this disclosure, the surface area of the ends of the prism-shaped object that forms the disk is greater than the lateral face of the prism-shaped object that forms the disk. In this disclosure, the ends of the prism-shaped structure that forms the disk are referred to as the faces of the disk.

Electronic Lock: As used in this disclosure, an electronic lock is an electromechanically operated lock that: 1) mechanically locks an object; and, 2) is secured and released using an electrical or electronically driven mechanism.

Exterior: As used in this disclosure, the exterior is used as a relational term that implies that an object is not contained within the boundary of a structure or a space.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Hardware: As used in this disclosure, refers to one or more incidental objects: 1) that are readily and commercially available; and, 2) that are associated with the installation, operation or maintenance of a primary object. Always use incidental.

Incidental: As used in this disclosure, incidental refers to a second object that is associated with a first object but that: 1) does not significantly affect the characteristics of the first object; and, 2) the function of which can be readily replaced by or substituted with a third object.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam, and, 3) the span of the length of the first arm roughly equals the span of the length of the second arm. Hyoids generally have a U shaped appearance.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Interlock: As used in this disclosure, an interlock is a device that disables the operation of a first mechanism without the release of a second mechanism. Generally, an interlock is used as a safety device.

Latch: As used in this disclosure, a latch is a fastening or locking mechanism. The use of the term latch does not necessarily but often implies the insertion of an object into a notch or cavity.

Lid: As used in this disclosure, a lid is a removable cover that is placed over an opening of a hollow structure to enclose the hollow structure.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a device that prevents the unauthorized entry into a container or chamber.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is an open prism-shaped containment structure. The superior structure of the pan is open when the pan is used normally. The superior structure is a horizontal surface selected from the group consisting of: a) an end of the prism structure that forms the pan; and, b) a lateral face of the prism structure that forms the pan.

Pivot: As used in this disclosure, a pivot is a rod or shaft around which an object rotates or swings.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular or disk like appearance. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder Rectangular Block: As used in this disclosure, a rectangular block refers to a three-dimensional structure comprising six rectangular surfaces (commonly called faces) formed at right angles. Within this disclosure, a rectangular block may further comprise rounded edges and corners.

Relaxed Shape: As used in this disclosure, a structure is considered to be in its relaxed state when no shear, strain, or torsional forces are being applied to the structure.

Remote Control: As used in this disclosure, remote control means the establishment of control of a device from a distance. Remote control is generally accomplished through the use of an electrical device that generates electrically based control signals that are transmitted via radio frequencies or other means to the device.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Superior: As used in this disclosure, the term superior refers to a directional reference that is parallel to and in the opposite direction of the force of gravity when an object is positioned or used normally.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Torsion: As used in this disclosure, torsion refers to the application of a torque to an object.

Torsion Spring: As used in this disclosure, a torsion spring is a mechanical device that stores mechanical energy through an opposing torque when the mechanical device is twisted. The torsion spring will return to its original relaxed shape when the twisting force is removed.

Unmanned Aerial Vehicle: As used in this disclosure, an unmanned aerial vehicle refers to a flying vehicle that is controlled remotely or automatically. By definition, an unmanned aerial vehicle does not transport a person. A common abbreviation for an unmanned aerial vehicle is UAV. The UAV is commonly referred to as a drone.

Vehicle: As used in this disclosure, a vehicle is a motorized device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Window: As used in this disclosure, a window is an opening formed in a structure that is fitted with glass or other transparent material in a frame to that allows the passage of light through the structure.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A deposit receptacle comprising:
 a drop box, a lid, a latch, and a plurality of torsion springs;
 wherein the lid attaches to the drop box;
 wherein the latch attaches to both the drop box and the lid;

wherein the plurality of torsion springs attaches to both the drop box and the lid;
wherein the deposit receptacle is configured for use with an unmanned aerial vehicle;
wherein the deposit receptacle receives a package delivered by the unmanned aerial vehicle;
wherein the deposit receptacle is configured for use with a residence;
wherein the deposit receptacle attaches to the residence such that the deposit receptacle is accessible from the exterior of the residence;
wherein the deposit receptacle automatically closes and locks after receiving a parcel;
wherein the drop box receives the package from the unmanned aerial vehicle;
wherein the lid encloses the drop box after the package has been received;
wherein the latch locks the deposit receptacle in a closed position;
wherein the plurality of torsion springs store the energy required to close the lid on the drop box;
wherein the drop box is a hollow prism-shaped structure;
wherein the drop box attaches the deposit receptacle to the residence;
wherein the lid is a plate structure;
wherein the form factor of the lid is geometrically similar to the drop box such that the lid encloses the drop box after receipt of the package;
wherein the lid attaches to the drop box such that the lid rotates relative to the drop box;
wherein the latch is a fastening structure that secures the lid to the drop box when the lid is in the closed position;
wherein the latch is a locking structure that locks the lid in the closed position until the latch is released from an interior of the residence via a release switch.

2. The deposit receptacle according to claim 1
wherein each of the plurality of torsion springs attaches the drop box to the lid;
wherein each of the plurality of torsion springs is identical;
wherein each of the plurality of torsion springs moves towards its relaxed shape as the lid moves to the closed position.

3. The deposit receptacle according to claim 2
wherein the drop box comprises a container, a pressure plate, and a window bracket;
wherein the window bracket attaches to the container;
wherein the container contains the pressure plate.

4. The deposit receptacle according to claim 3
wherein the container is a hollow prism-shaped structure;
wherein the container forms the containment space provided by the drop box for the package;
wherein the container has the shape of a pan;
wherein the container is further defined with a first face, a second face, a third face, a fourth face, a fifth face, and a sixth face.

5. The deposit receptacle according to claim 4
wherein the pressure plate is a mechanical structure that is contained within the container;
wherein the pressure plate releases the plurality of torsion springs from a deformed position such that the plurality of torsion springs will move towards their relaxed shape;
wherein the pressure plate releases the plurality of torsion springs when the weight of the package is placed on the pressure plate.

6. The deposit receptacle according to claim 5
wherein the pressure plate comprises a rotating disk, a plate hinge, and a batten;
wherein the rotating disk is a plate structure;
wherein the rotating disk rotates relative to the container;
wherein the plate hinge is a hinge that attaches the rotating disk to an interior surface of the container;
wherein the plate hinge attaches the rotating disk to the container such that the rotating disk rotates within the container;
wherein the batten is a mechanical structure that attaches the rotating disk to the lid such that the batten holds the plurality of torsion springs in a deformed state.

7. The deposit receptacle according to claim 6
wherein the batten comprises a batten shaft, an inferior batten guide, a superior batten guide, and a batten hinge;
wherein the batten shaft is further defined with a first end and a second end;
wherein the batten shaft is a shaft structure;
wherein the rotating disk rotates such that the second end of the batten shaft is pulled below the lid plate;
wherein the inferior batten guide has a hyoid shape;
wherein inferior batten guide attaches to an interior vertical surface of the container such that the batten shaft inserts through the inferior batten guide between the inferior batten guide and the container;
wherein the superior batten guide has a hyoid shape;
wherein the superior batten guide attaches to the interior horizontal surface of the lid plate such that the batten shaft inserts through the superior batten guide between the superior batten guide and the lid plate;
wherein the batten hinge attaches the first end of the batten shaft to the rotating disk of the pressure plate.

8. The deposit receptacle according to claim 7
wherein the residence further comprises a window;
wherein the window further comprises a window sill;
wherein the window bracket is a mechanical structure that attaches to the container;
wherein the window bracket attaches the container to the window sill of the residence.

9. The deposit receptacle according to claim 8
wherein the lid comprises a lid plate and a lid hinge;
wherein the lid hinge attaches the lid plate to the container;
wherein the lid plate is a plate structure that rotates relative to the container;
wherein the lid plate is geometrically similar to the sixth face of the container such that the lid plate encloses the container;
wherein the lid hinge attaches the lid plate to the container such that the lid plate rotates relative to the container;
wherein the lid plate is further defined with a seventh face and an eighth face.

10. The deposit receptacle according to claim 9
wherein the latch comprises a deadbolt and a bolt box;
wherein the deadbolt is a shaft that attaches to the lid plate of the lid such that the deadbolt inserts into the bolt box when the lid plate is in the closed position;
wherein the bolt box locks the position of the deadbolt within the bolt box.

11. The deposit receptacle according to claim 10
wherein the bolt box further comprises a bolt cavity, an electric lock, and the release switch;
wherein the bolt cavity is a negative space formed in the bolt box;

wherein the bolt cavity is geometrically similar to the deadbolt such that the deadbolt inserts into the bolt cavity when the lid is in the closed position.

12. The deposit receptacle according to claim 11
wherein the electric lock is an electrically controlled and powered locking mechanism;
wherein the electric lock locks the deadbolt into position when the deadbolt enters the bolt box;
wherein the release switch is a maintained switch;
wherein the release switch releases the electric lock such that the lid can open.

13. The deposit receptacle according to claim 12
wherein the plurality of torsion springs comprises a first torsion spring and a second torsion spring;
wherein the first torsion spring attaches the container to the lid plate;
wherein the second torsion spring attaches the container to the lid plate.

14. The deposit receptacle according to claim 13
wherein the first torsion spring attaches to the container and the lid plate such that separating the lid plate from the container, applies a torque to the first torsion spring such that the first torsion spring attempts to close the lid plate to return to its relaxed shape at a position enclosing the container;
wherein the second torsion spring attaches to the container and the lid plate such that separating the lid plate from the container, applies a torque to the second torsion spring such that the second torsion spring attempts to close the lid plate to return to its relaxed shape at a position enclosing the container.

15. The deposit receptacle according to claim 14
wherein when the batten presses against the lid plate and the container, the first torsion spring applies a force against the batten through the lid plate and the container that effectively separates the lid plate from the container;
wherein when the batten presses against the lid plate and the container, the second torsion spring applies a force against the batten through the lid plate and the container that effectively separates the lid plate from the container.

16. The deposit receptacle according to claim 15
wherein the plate hinge attaches the rotating disk to the fifth face of the container such that the rotating disk rotates towards and away from the third face of the container;
wherein the batten hinge attaches the first end of the batten shaft to the rotating disk;
wherein the inferior batten guide attaches to the third face of the container;
wherein the superior batten guide attaches to the seventh face of the lid plate of the lid;
wherein the window bracket attaches to the exterior surface of the third face of the container;
wherein the lid hinge attaches the lid plate to the third face of the container;
wherein the deadbolt attaches to the seventh face of the lid plate at a location distal to the lid hinge;
wherein the bolt box attaches to the first face of the container at the sixth face of the container;
wherein the first torsion spring attaches the third face of the container to the seventh face of the lid plate;
wherein the second torsion spring attaches the third face of the container to the seventh face of the lid plate.

* * * * *